Jan. 21, 1969
A. G. BLANTON ET AL
3,423,132
COTTON HARVESTER DELIVERY CONVEYOR
Filed Nov. 13, 1967
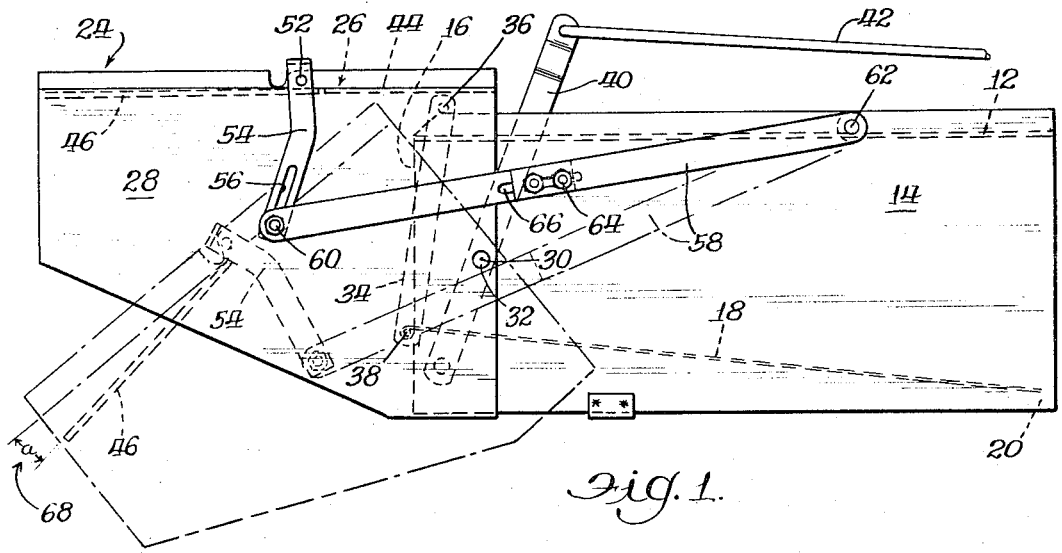
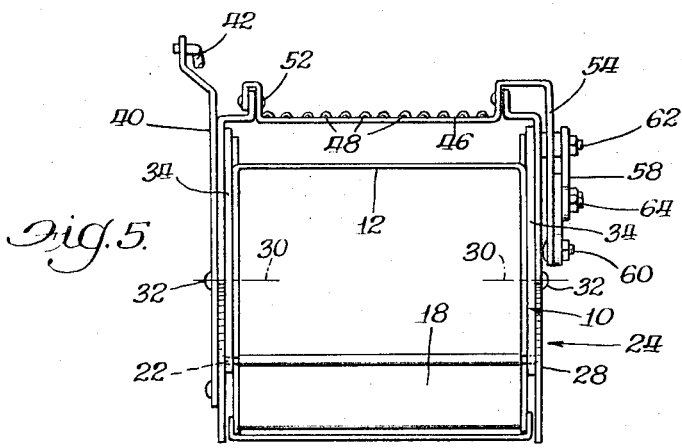
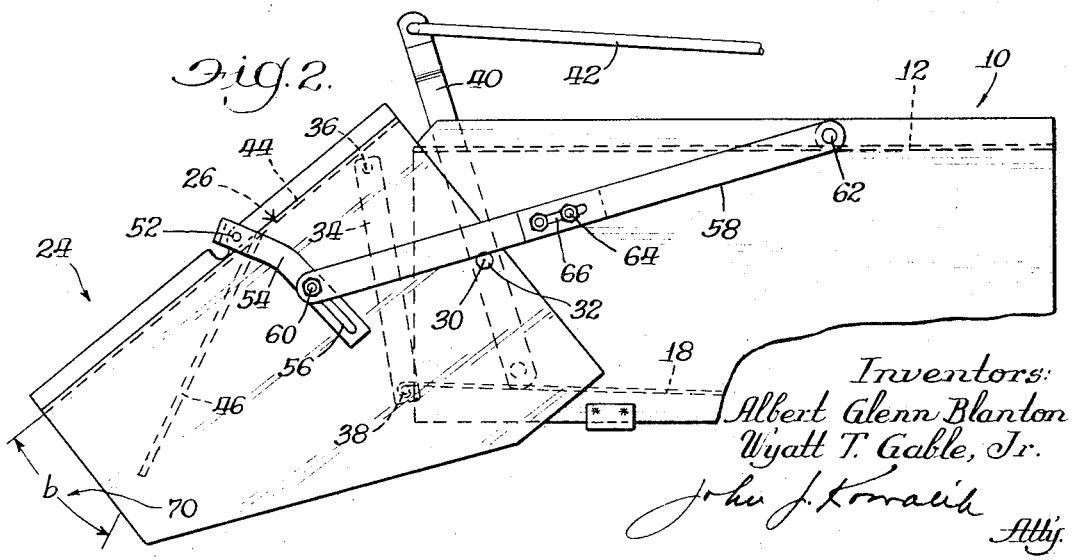
Inventors:
Albert Glenn Blanton
Wyatt T. Gable, Jr.
John J. Kowalik
Atty.

Inventors:
Albert Glenn Blanton
Wyatt T. Gable, Jr.

_United States Patent Office_

3,423,132
Patented Jan. 21, 1969

3,423,132
COTTON HARVESTER DELIVERY CONVEYOR
Albert G. Blanton and Wyatt T. Gable, Jr., Memphis, Tenn., assignors to International Harvester Company, Chicago, Ill., a corporation of Delaware
Filed Nov. 13, 1967, Ser. No. 682,251
U.S. Cl. 302—61                    9 Claims
Int. Cl. B65g 53/42

ABSTRACT OF THE DISCLOSURE

Delivery conduit having an outlet nozzle adjustable as to size, a hood for controlling the direction of flow of the air stream and cotton emerging from the conduit, the hood automatically adjusting the size of the nozzle according to different positions of the hood, with pre-settable means for varying the degree of adjusting the nozzle size.

Cross-reference

Co-pending application of the present Albert Glenn Blanton, Ser. No. 671,669, filed Sept. 29, 1967, assigned to the assignee of the present invention.

Objects of the invention

The invention relates generally to cotton harvesters utilizing an air stream blown through a conduit for delivering the cotton to a trailer. The device incorporates a construction for producing a high-speed air stream for delivering the cotton to the far end of the trailer and a low-speed air stream for delivering it to the near end, utilizing a deflecting hood on the conduit, in response to moving the hood to corresponding positions, as disclosed and claimed broadly in the above mentioned co-pending application.

A broad object of the present invention is to provide apparatus of the foregoing general character including means for varying the degree of deflection of the fluid stream issuing from the conduit, for any given setting of the hood.

Another object is to provide apparatus of the foregoing general character for controlling the fluid stream of air and cotton particles for directing it selectively in a straightaway direction or deflecting it in another direction, which utilizes an open-work grate as a deflecting element, the grate being operative for so deflecting the solid cotton particles but enabling the greater portion of air to pass through the grate.

Another and more specific object is to provide apparatus of the character stated in which the deflecting hood is moved to different positions for correspondingly controlling the direction of the air stream issuing from the conduit, and in which the hood has a movable wall element which directly deflects the fluid stream, and which includes pre-settable means for adjustably varying the amount of movement of the movable wall element for any given amount of movement of the hood.

Description of a preferred embodiment of the invention

FIGURE 1 is a side view of the delivery end portion of a conduit, and a hood thereon, embodying the features of the present invention;

FIGURE 2 is a view similar to FIGURE 1 but showing the deflecting wall element in a different position according to a pre-setting;

FIGURE 5 is an end view.

Figure 3:
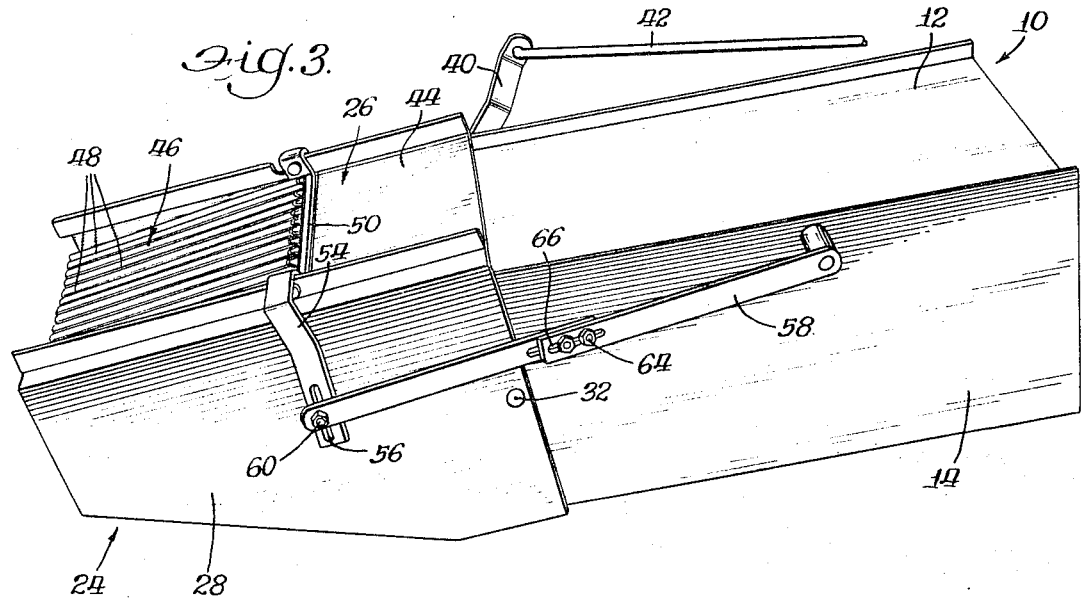
FIGURE 3 is a perspective view of the apparatus.

Referring now in detail to the accompanying drawings, a pipe or conduit is shown at 10 which leads from a cotton harvester, such as a stripper, to a trailer drawn by the same power means, such as a tractor, that draws the stripper. The cotton upon being stripped is blown in an air stream through the conduit and into the trailer, in a known manner. The stream, including air and cotton particles, blown through the conduit, may be termed a fluid, i.e., it is made up of flowing materials. The conduit 10 may be rectangular in cross-section, including a top element 12 and depending side walls 14. The conduit terminates in a variable orifice outlet nozzle 16 at its delivery end, and this portion or orifice of the conduit may be closed at the bottom by a movable plate or vane 18 pivoted at 20 in the side walls 14 at a position removed from the nozzle, by means of pins or trunnion elements 22. The forward end of the plate 18 terminates substantially in the nozzle and forms the bottom defining element thereof. The forward end of the plate is movable vertically upon rocking movements of the plate about its pivot axis at 20 to vary the orifice area of the nozzle 16.

Mounted on the delivery end of the conduit 10 is a hood 24 having a top 26 and depending side wall elements 28, and it may be open at the bottom. Preferably the side wall elements 28 of the hood straddle the conduit and the hood is arranged for vertical swinging movement about a transverse axis at 30 formed as by pins or trunnion elements 32 mounted in the side wall elements 28 and the side walls 14 of the conduit. The hood is then swingable from an upper straight position represented in FIGURES 1 and 3 and a lowermost position represented in FIGURES 2 and 4.

Figure 4:
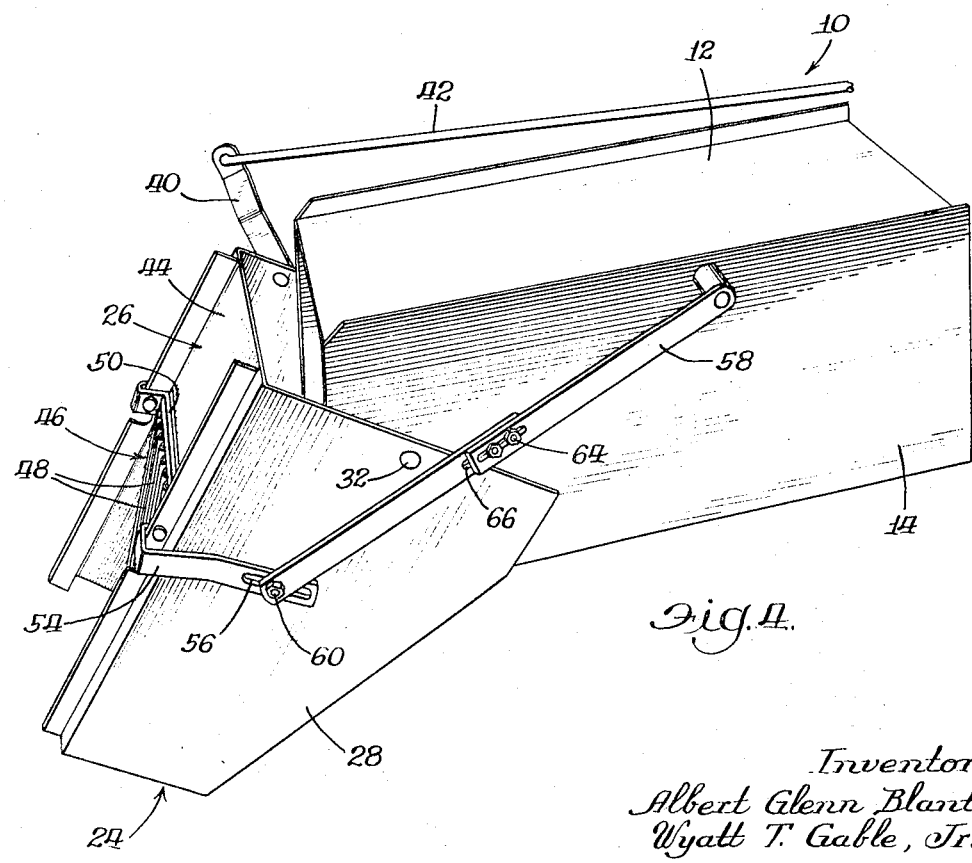
FIGURE 4 is a perspective view of the apparatus showing the hood in a different position from that shown in FIGURE 3.

Mounted on the hood, are links 34, preferably one on each side, pivotally mounted at one end at 36 in the side wall elements of the hood and pivoted at their other ends at 38 in the front swinging end of the plate 18. An arm 40 is secured to the hood, and pivotally connected thereto is a rod 42 leading to the tractor for use by the operator for swinging the hood to various positions between its two positions noted. In the upper position of the hood as in FIGURES 1 and 3, the hood is substantially a longitudinal extension of the delivery end portion of the fluid conduit 10, while in its lower position as represented in FIGURES 2 and 4, it is at an acute angle to the conduit and arranged for deflecting the fluid issuing from the conduit, in this case generally downwardly.

The conduit 10 may be adjacent the horizontal at its delivery end, for directing the fluid stream to the far end of the trailer; when the far end is filled, and it is desired to fill nearer portions of the trailer, the hood is moved progressively downwardly toward its lowermost position. When the hood is in its uppermost position, the plate 18 is in a raised position, restricting the size of the nozzle 16 thereby producing a high speed stream for more effectively delivering the cotton to the far end of the trailer. When the hood is in its lower position, the plate 18 is also in its lower position, increasing the area of the nozzle and thereby reducing the speed of the stream issuing therefrom, thus preventing undue scattering or boiling of the cotton at the near end of the trailer.

The foregoing construction is disclosed and claimed fully in the co-pending application referred to above, and the present invention includes an additional feature for controlling the deflection of the air stream in a more highly developed manner. To carry this feature into effect, the top 26 of the hood 24 may include a fixed rear element 44, but the forward portion is made up of a movable wall element 46 preferably in the form of a grate including a plurality of open-ended spaced fingers 48 secured to a rear cross bar 50 pivoted in the side wall elements 28 by means of pins 52 forming a transverse axis for vertical swinging movement of the forward ends of the fingers. Secured to one end of the cross bar 50 is a downwardly extending lever arm 54 preferably exteriorly of the hood, having a slot 56 in its lower end. A link 58 has its forward end pivotally connected to the arm 54 by suitable means 60 riding in the slot 56 and arranged for adjustably positioning the forward end of the link 58 in the slot 56. The rear end of the link 58 is pivoted at 62 at a fixed location, such as in the side wall 14 of the fluid condit. The link 58 is preferably made of two parts interconnected by means 64 working in a slot 66 in one of the parts and enabling adjusted fixed lengths of the link.

Upon downward swinging of the hood, the link 58, acting through the arm 54 swings the grate 48 downwardly relative to the remaining portion of the hood to for example an angle *a* represented at 68 in FIGURE 1. By adjustably positioning the front end of the link 58 at different locations in the slot 56, the grate 46 can be made to swing a greater or lesser amount relative to the remaining portion of the hood. For example, when the link 58 is at a lowermost position in the arm 54, the arm 54 will be angled a minimum amount for positioning the grate in for example the position shown in FIGURE 1 at the angle *a* mentioned. On the other hand, by positioning the forward end of the link 58 at an upper position in the slot 56, the arm 54, due to the lesser effective radial length of connection between that arm and the link, will be thrown or moved downwardly a greater amount relative to the remaining portion of the hood to a position such as represented by the angle *b* indicated at 70 in FIGURE 2. The connection 64, 66 in the parts of the link, provide the different effective lengths of the link for positioning the forward end in the slot 56, for any given position of the grate 46. The angle of incidence at *a* is different than at *b* of the grate with the air entrained material.

As stated above when the operator desires to fill nearer portions of the trailer, he swings the hood 24 downwardly, for deflecting the cotton downwardly as described generally in the copending application referred to above. In the construction of that application, the fixed top element of the hood serves as the element which is impinged on by the cotton and which directly deflects it downwardly, but in the present instance the grate 46 serves as that member. The present invention, including the grate 46 and its differential positioning, provides the following distinct advantages:

(a) The spacing of the fingers enables a substantial portion, if not all, of the air issuing from the conduit to pass between the fingers so that it will not be directed onto the aggregate of cotton in the trailer, eliminating disturbance of the cotton;

(b) The open grate reduces back pressure in the conduit and eliminates or minimizes plugging or choking in the harvester;

(c) The grate moves through a greater angle than the hood proper does, changing the angle of incidence of the grate with the air entrained material and providing more effective control since the operator need move the hood a relatively small amount for deflecting the fluid stream a substantially greater amount;

(d) The mechanism can be set for moving or throwing the grate 46 a different amount for any given amount of movement of the hood proper, to accommodate for example different features of the trailer.

We claim:

1. Apparatus of the character disclosed comprising a fluid conduit having an outlet nozzle, a hood movably mounted on the conduit adjacent the outlet nozzle, the hood including a movable wall element for direct engagement by a fluid stream issuing from the conduit and for thereby deflecting portions of the stream, and means operative, in response to movement of the hood, for moving the movable wall element an amount different from the amount of movement of the hood proper.

2. The invention according to claim 1 and including pre-settable means operative in response to movement of the hood for moving said movable wall element an amount corresponding to a pre-set condition of said pre-settable means.

3. The invention according to claim 1 in conjunction with means for decreasing the speed of the fluid stream upon issuing from the conduit in response to positioning said hood for engagement by the fluid.

4. The invention according to claim 1 wherein the conduit includes a bounding element at its outlet nozzle movable for varying the side of the nozzle, the hood is mounted for movement between a generally straight position in which the fluid stream on issuing from the conduit continues in the same direction, and another position in which it deflects at least portions of the stream to a direction at an angle to the first direction, means interconnects the hood and said movable wall element for moving the movable wall element to a position for decreasing the size of the outlet nozzle when the hood is in a straight position and increasing the outlet nozzle when the hood is in a deflecting position.

5. The invention set out in claim 4 and including linkage interconnected between said movable wall element and a fixed element of the fluid conduit, said linkage being operative, in response to movement of the hood from straight position to deflecting position, for moving the movable wall element an amount greater than the movement of the hood, and to a position in which it is impinged on by fluid issuing from the conduit.

6. The invention according to claim 5 wherein said linkage is pre-settable to different adjusted positions whereby to be operative for moving said movable wall element different amounts according to different pre-settings.

7. Apparatus of the character disclosed comprising a fluid conduit having an outlet nozzle, a hood movably mounted on the conduit adjacent the outlet nozzle, the hood being movable to different positions, including a position in which it is operative for deflecting at least portions of a fluid stream issuing from the conduit, said hood having an open-work bounding element which, when the hood is in its deflecting position, constitutes the element directly impinged on by the fluid stream and which operates to deflect cotton carried in said stream and to enable air in the stream to pass through the open-work bounding element and means for concomitantly enlarging the discharge area of the outlet nozzle when the hood is in its deflecting position.

8. The invention according to claim 7 wherein the open-work element is constituted by a plurality of transversely spaced longitudinally extending fingers.

9. Apparatus of the character disclosed comprising a fluid conduit having an outlet nozzle with a variable area orifice, and adapted for conveying a fluid stream which includes air and solid particles, and means for deflecting the solid particles in the fluid stream in a direction at an angle to the direction they move in issuing from the conduit, while enabling at least a substantial portion of the air to continue moving substantially in the same direction it moves on issuing from the conduit, and means for varying the area of the orifice in proportion to the angle of incidence of the air with said deflecting means.

References Cited

UNITED STATES PATENTS 3,367,725   2/1968   Sanderson et al. _____ 302—61

ANDRES H. NIELSEN, *Primary Examiner.*